United States Patent
Yang et al.

(10) Patent No.: US 10,170,072 B2
(45) Date of Patent: Jan. 1, 2019

(54) GATE LINE LAYOUT CONFIGURATION

(71) Applicant: APPLE INC., Cupertino, CA (US)

(72) Inventors: Byung Duk Yang, Cupertino, CA (US); Chun-Yao Huang, Cupertino, CA (US); Kyung Wook Kim, Cupertino, CA (US); Patrick B. Bennett, Cupertino, CA (US); Shih Chang Chang, Cupertino, CA (US); Wonjae Choi, Cupertino, CA (US); Hao-Lin Chiu, Campbell, CA (US); Kwang Soon Park, San Ramon, CA (US); Xinyu Zhu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 14/860,397

(22) Filed: Sep. 21, 2015

(65) Prior Publication Data

US 2017/0084247 A1   Mar. 23, 2017

(51) Int. Cl.
*G09G 5/00* (2006.01)
*G09G 3/20* (2006.01)
*G02F 1/1345* (2006.01)

(52) U.S. Cl.
CPC .............. *G09G 5/003* (2013.01); *G09G 3/20* (2013.01); *G02F 2001/13456* (2013.01);
(Continued)

(58) Field of Classification Search
CPC ..... G09G 2310/0245; G09G 2310/063; G09G 2300/0434; G09G 2300/0439; G09G 2300/0443; G09G 2300/0447; G09G 2300/0452; G09G 2300/0456; G09G 2300/046; G09G 2300/0465; G09G 2300/0469; G09G 2300/0473; G09G 2300/0478; G09G 2300/0482; G09G 5/003; G09G 3/20; G09G 2320/0219; G09G 2300/043; G09G 2310/0278; G09G 2310/0281; G09G 2300/0413;
(Continued)

(56) References Cited

U.S. PATENT DOCUMENTS 6,256,076 B1 *   7/2001   Bae ................... G02F 1/136213
                                                  349/38
6,496,238 B1 *  12/2002   Greene .................. A01N 63/00
                                                  349/42

(Continued)

OTHER PUBLICATIONS

International Search Report and Written Opinion for PCT Application No. PCT/US2016-048300 dated Nov. 21, 2016; 11 pgs.

*Primary Examiner* — Grant Sitta
(74) *Attorney, Agent, or Firm* — Fletcher Yoder PC

(57) ABSTRACT

A display device may include pixels and source lines that provide data line signals to the pixels. The display device may also include gate lines that provide gate signals to switches associated with the pixels. The display device may also include vertical gate lines disposed generally parallel to the source lines and coupled to the gate lines at cross point nodes. The display device may also include compensation lines, such that each compensation line is proximate to a respective vertical gate line. The compensation lines may transmit compensation signals having an opposite polarity as compared to respective gate signals to reduce or eliminate a kickback voltage on at least one of the plurality of pixels.

15 Claims, 15 Drawing Sheets

(52) U.S. Cl.
CPC ........... *G09G 2300/043* (2013.01); *G09G 2300/0413* (2013.01); *G09G 2300/0426* (2013.01); *G09G 2300/0819* (2013.01); *G09G 2310/0278* (2013.01); *G09G 2310/0281* (2013.01); *G09G 2320/0204* (2013.01); *G09G 2320/0209* (2013.01); *G09G 2320/0219* (2013.01); *G09G 2330/021* (2013.01)

(58) Field of Classification Search
CPC ... G09G 2320/0209; G09G 2300/0426; G09G 2330/021; G09G 2320/0204; G02F 2001/13456
USPC ............................................. 345/214, 87
See application file for complete search history.

(56) References Cited

U.S. PATENT DOCUMENTS

| | | | | |
|---|---|---|---|---|
| 8,054,272 B2* | 11/2011 | Lee | ............... | G02F 1/1345 345/87 |
| 8,179,511 B2* | 5/2012 | Kang | ............... | G02F 1/134363 349/141 |
| 8,363,192 B2* | 1/2013 | Takahashi | ............... | G02F 1/136286 349/139 |
| 8,384,870 B2 | 2/2013 | Lee et al. | | |
| 8,692,819 B2 | 4/2014 | Moon | | |
| 9,024,013 B2 | 5/2015 | Jung et al. | | |
| 9,285,913 B1* | 3/2016 | Kang | ............... | G06F 3/0412 |
| 9,881,573 B2* | 1/2018 | Chang | ............... | G09G 3/3655 |
| 10,043,472 B2* | 8/2018 | Wang | ............... | G09G 3/3655 |
| 2003/0030630 A1* | 2/2003 | Bayot | ............... | G09G 3/20 345/204 |
| 2004/0189884 A1* | 9/2004 | Kim | ............... | G02F 1/136213 349/38 |
| 2005/0024316 A1* | 2/2005 | Ohta | ............... | G09G 3/3688 345/100 |
| 2006/0061534 A1* | 3/2006 | Lee | ............... | G09G 3/3648 345/92 |
| 2006/0071883 A1* | 4/2006 | Oh | ............... | G09G 3/3233 345/76 |
| 2007/0132895 A1* | 6/2007 | Shen | ............... | G09G 3/2007 349/1 |
| 2007/0152947 A1* | 7/2007 | Tanaka | ............... | G09G 3/3688 345/100 |
| 2008/0111933 A1* | 5/2008 | Lee | ............... | G02F 1/13306 349/38 |
| 2008/0225027 A1* | 9/2008 | Toyomura | ............... | G09G 3/3233 345/204 |
| 2010/0053056 A1* | 3/2010 | Lee | ............... | G02F 1/1345 345/94 |
| 2010/0195388 A1* | 8/2010 | Jung | ............... | G11C 11/5628 365/185.03 |
| 2010/0259701 A1* | 10/2010 | Lin | ............... | G02F 1/136286 349/39 |
| 2011/0074746 A1* | 3/2011 | Chang | ............... | G09G 3/20 345/204 |
| 2011/0102309 A1* | 5/2011 | Cho | ............... | G09G 3/3648 345/92 |
| 2011/0227955 A1* | 9/2011 | Lee | ............... | G09G 3/3648 345/690 |
| 2012/0086743 A1* | 4/2012 | Shiomi | ............... | G02F 1/136213 345/694 |
| 2013/0082996 A1* | 4/2013 | Kim | ............... | G09G 3/3677 345/210 |
| 2013/0113766 A1 | 5/2013 | Kim et al. | | |
| 2013/0229400 A1* | 9/2013 | Kim | ............... | G06F 3/038 345/212 |
| 2014/0062331 A1* | 3/2014 | Nam | ............... | G09G 3/3233 315/226 |
| 2014/0062981 A1* | 3/2014 | Huang | ............... | G09G 3/3648 345/211 |
| 2014/0104155 A1 | 4/2014 | Long et al. | | |
| 2014/0152938 A1* | 6/2014 | Lee | ............... | G09G 3/3648 349/46 |
| 2014/0253531 A1* | 9/2014 | Lee | ............... | G09G 3/3677 345/212 |
| 2014/0333592 A1* | 11/2014 | Cho | ............... | G09G 3/3677 345/204 |
| 2014/0375922 A1* | 12/2014 | Park | ............... | G02F 1/136286 349/46 |
| 2015/0187318 A1* | 7/2015 | Kim | ............... | G02F 1/13624 345/206 |
| 2016/0035287 A1* | 2/2016 | Merkin | ............... | G09G 3/3611 345/205 |
| 2016/0203753 A1* | 7/2016 | Hwang | ............... | G09G 3/2092 345/212 |

* cited by examiner

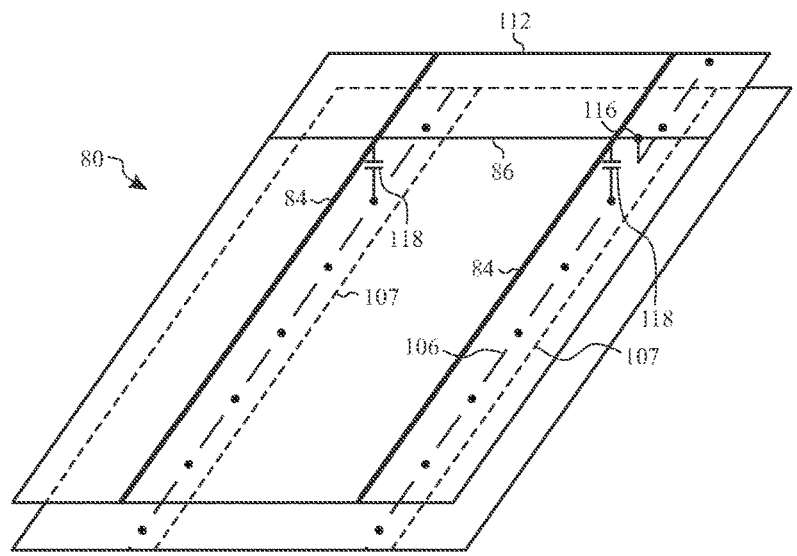
FIG. 7
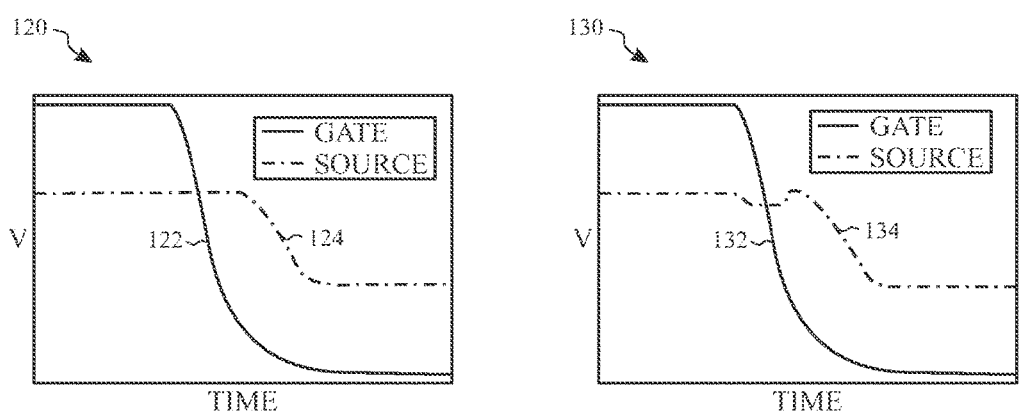
FIG. 8
FIG. 9

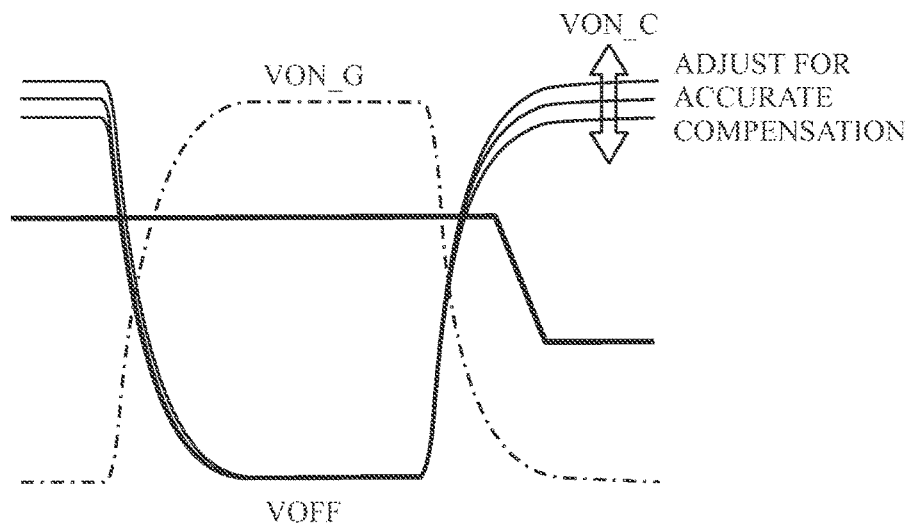
FIG. 18
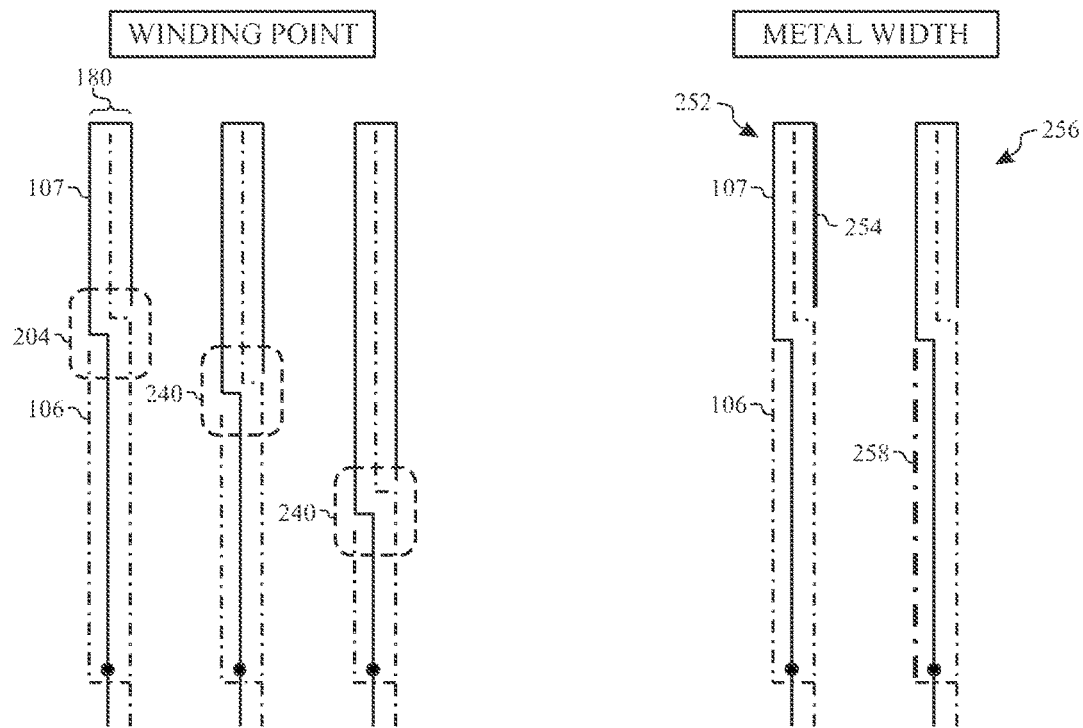
FIG. 19
FIG. 20

GATE LINE LAYOUT CONFIGURATION

BACKGROUND

This disclosure relates to systems and methods to reduce or eliminate certain coupling effects that may occur in electronic display devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays are employed in a variety of electronic devices, including mobile phones, televisions, and tablet computing devices. To facilitate the designs of these electronic devices, it may be beneficial to reduce the size of a bezel region that surrounds an electronic display. In some cases, however, reducing the bezel region may be accompanied with certain undesirable visual effects.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic display may have a reduced bezel region by employing driving circuitry on one side of the bezel region rather than on more than one sides of the bezel region. In general, the circuitry of the electronic display may include a gate driver integrated circuit (GDIC) and a column driver IC (e.g., source driver IC). The gate driver IC couples voltages across gate lines that run in one direction (e.g., horizontally) across a display panel of the electronic display, while the source driver IC couples data line signals (e.g., gray level) to source lines that run in another direction (e.g., vertically) across the display panel. In combination, the gate driver IC and the source driver IC may program pixels in the display panel to display desired image data that may be provided via a processor. To reduce the size of the bezel region, rather than place the gate driver IC on one side (e.g., along vertical edge) of the electronic display and place the source driver IC on another side (e.g., along horizontal edge) of the electronic display, the gate driver IC and the source driver IC may be co-located along one side of the electronic display. For example, the gate driver IC and the source driver IC may both be located adjacent to a horizontal edge or a vertical edge of the display panel.

Since both the gate driver IC and the source driver IC may be co-located on the same side of the electronic display, additional wiring may be provided in the display panel to allow the gate driver IC to supply the gate signal to the appropriate gate lines. Because the gate lines may be described as having an orientation that is "horizontal" in relation to the "vertical" source lines, the additional wiring that connects the gate lines to the gate driver IC may be referred to as "vertical gate lines" or v-gate lines. It should be appreciated that these terms are merely used to provide guidance as to their relative orientations, and not to imply a fixed orientation (e.g., the source lines and v-gate lines may be "horizontal" and the gate lines may be "vertical" when the electronic display is turned). The respective v-gate lines may progress across the electronic display toward corresponding gate lines in a generally parallel orientation to the source lines. Each v-gate line may be coupled to a respective gate line at a cross point node. In certain embodiments, each cross point node may include some uniform space between each cross point node. That is, each cross point node may be located generally along a line diagonally across the display. In this case, due to the proximity between the parallel v-gate lines and the source lines, the pixels located at the cross point nodes may experience a coupling effect that may alter voltage signals received by the respective pixels via the respective source lines due to the voltage signals present on the v-gate lines. As a result, the respective pixel value depicted at each respective pixel located near a cross point node may be less than or more than the desired pixel value. This altered pixel value may cause an undesirable artifact to appear on the display along the line where the cross point nodes are located.

With the foregoing in mind, in certain embodiments, to reduce the visibility of this undesired line, wiring for compensation lines may be included in the display in addition to the gate lines, the v-gate lines, and the source lines. The v-gate lines and the compensation lines may be arranged according to a pattern or design that may enable magnetic and electric fields from the compensation lines to mitigate or cancel the magnetic and electric fields from the v-gate lines. That is, in certain embodiments, a gate driver IC may send gate signals to pixels via the v-gate lines and the gate lines to turn the pixels on and off. At the same time, the gate driver IC may send compensation signals to the compensation lines, such that the compensation signals may include the same waveform as the gate signal but at the opposite phase. The compensation lines thus may reduce or eliminate the coupling effects that might otherwise be generated by the v-gate lines. Additional details regarding the manner in which the cross point nodes are positioned and corresponding gate drive circuitry used to coordinate the display of image data via the cross point nodes will be discussed below.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 is a circuit diagram illustrating example layouts of vertical-gate lines (v-gate lines), gate lines, and source lines that may be part of the display in the electronic device of FIG. 1, in accordance with aspects of the present disclosure;

FIG. 8 is a graph of expected voltage and data line signals received by a pixel of the display in the electronic device of FIG. 1 via a respective gate line and a respective source line, in accordance with aspects of the present disclosure;

FIG. 9 is a graph of example voltage and data line signals received by a pixel of the display in the electronic device of FIG. 1 via a respective gate line and a respective source line, in accordance with aspects of the present disclosure;

FIG. 15 is a schematic wiring diagram illustrating an arrangement of a v-gate line and a compensation line of the display in the electronic device of FIG. 1, in accordance with aspects of the present disclosure;

FIG. 18 is a graph illustrating various adjustment waveforms that may be provided to the compensation line of the display in the electronic device of FIG. 1, in accordance with aspects of the present disclosure;

FIG. 19 is a schematic diagram illustrating an alternate unit arrangement of v-gate lines and compensation lines with various winding points, in accordance with aspects of the present disclosure;

FIG. 20 is a schematic diagram illustrating an alternate unit arrangement of v-gate lines and compensation lines with different metal widths, in accordance with aspects of the present disclosure;

DETAILED DESCRIPTION

Figure 1:
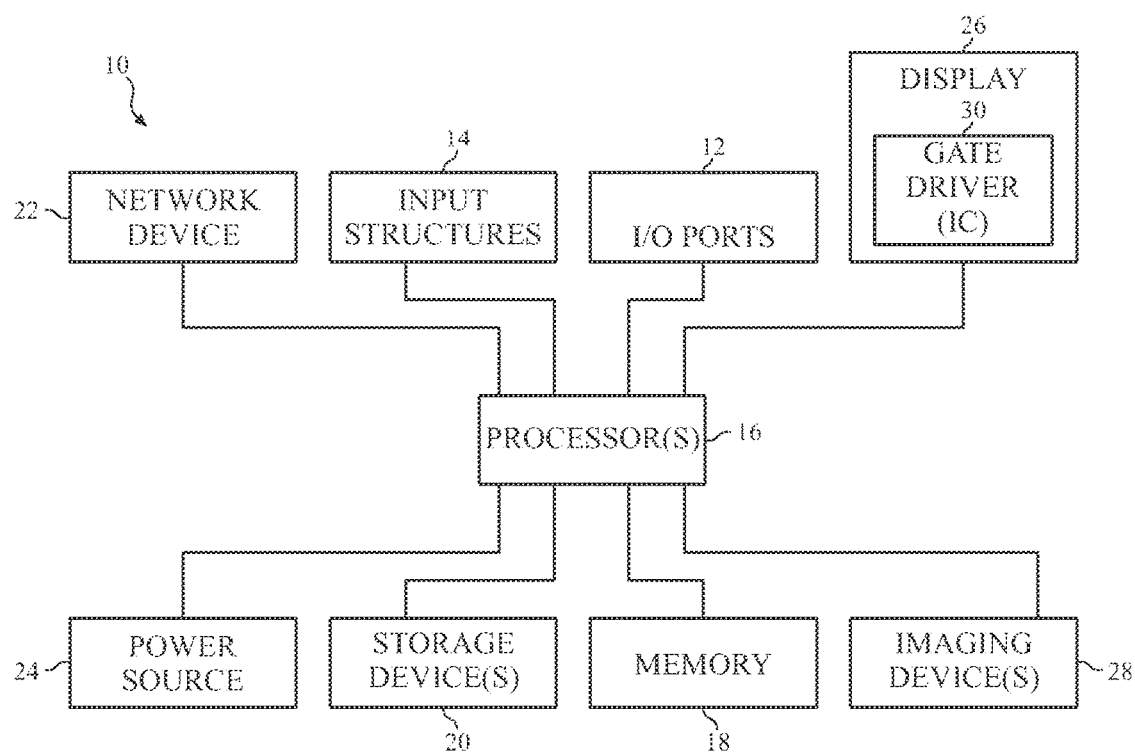
FIG. 1 is a simplified block diagram of components of an electronic device that may depict image data on a display, in accordance with embodiments described herein.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, at or near a cross-point pixel where a vertical-gate line (v-gate line) couples to a gate line, a corresponding data line signal received via a source line parallel to the v-gate line at the cross-point pixel may experience a voltage kickback due to the coupling effect between the v-gate line and the source line. The voltage kickback may occur when the gate when the gate driver IC turns a corresponding gate at the cross-point pixel off (e.g., switches voltage from high to low) due to the coupling effect between the v-gate line and the source line. For example, when a voltage signal provided to a gate line via the v-gate line at a cross-point pixel changes from high to low, the voltage signal provided to the cross-point pixel via the source line may decrease due to the coupling effect. As a result, the pixel may depict a gray level illumination that is less than the desired gray level for the pixel as per the desired image data.

To compensate for the kickback voltage caused by the coupling effect, in certain embodiments, a display of an electronic device may include a v-gate line that receives gate signals for activating pixels and a compensation line that receives compensation signals to counteract a coupling effect between a v-gate line and a source line. The v-gate line may be arranged according to a particular pattern and the compensation line may be arranged in a pattern that mirrors the pattern of the v-gate line. The compensation signal provided to the compensation line may include the same waveform as provided in the gate signal but at an opposite polarity. As a result, the kickback voltage caused by the v-gate line may be reduced or eliminated (e.g., neutralized or mitigated) by the electric field generated by the compensation signal. Additional details regarding neutralizing the coupling effects that may be present at cross point nodes will be described with reference to FIGS. 1-22 below.

By way of introduction, FIG. 1 is a block diagram illustrating an example of an electronic device 10 that may include the gate driver and column driver circuitry mentioned above. The electronic device 10 may be any suitable electronic device, such as a laptop or desktop computer, a mobile phone, a digital media player, television, or the like. By way of example, the electronic device 10 may be a portable electronic device, such as a model of an iPod® or iPhone®, available from Apple Inc. of Cupertino, Calif. The electronic device 10 may be a desktop or notebook computer, such as a model of a MacBook®, MacBook® Pro, MacBook Air®, iMac®, Mac® Mini, or Mac Pro®, available from Apple Inc. In other embodiments, electronic device 10 may be a model of an electronic device from another manufacturer.

As shown in FIG. 1, the electronic device 10 may include various components. The functional blocks shown in FIG. 1 may represent hardware elements (including circuitry), software elements (including code stored on a computer-readable medium) or a combination of both hardware and software elements. In the example of FIG. 1, the electronic device 10 includes input/output (I/O) ports 12, input structures 14, one or more processors 16, a memory 18, nonvolatile storage 20, networking device 22, power source 24, display 26, and one or more imaging devices 28. It should be appreciated, however, that the components illustrated in FIG. 1 are provided only as an example. Other embodiments of the electronic device 10 may include more or fewer components. To provide one example, some embodiments of the electronic device 10 may not include the imaging device(s) 28.

Before continuing further, it should be noted that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Considering each of the components of FIG. 1, the I/O ports 12 may represent ports to connect to a variety of devices, such as a power source, an audio output device, or other electronic devices. The input structures 14 may enable user input to the electronic device, and may include hardware keys, a touch-sensitive element of the display 26, and/or a microphone.

The processor(s) 16 may control the general operation of the device 10. For instance, the processor(s) 16 may execute an operating system, programs, user and application interfaces, and other functions of the electronic device 10. The processor(s) 16 may include one or more microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As may be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, Preview®, iMovie®, or Final Cut Pro® available from Apple Inc., or the "Camera" and/or "Photo" applications provided by Apple Inc. and available on some models of the iPhone®, iPod®, and iPad®.

A computer-readable medium, such as the memory 18 or the nonvolatile storage 20, may store the instructions or data to be processed by the processor(s) 16. The memory 18 may include any suitable memory device, such as random access memory (RAM) or read only memory (ROM). The nonvolatile storage 20 may include flash memory, a hard drive, or any other optical, magnetic, and/or solid-state storage media. The memory 18 and/or the nonvolatile storage 20 may store firmware, data files, image data, software programs and applications, and so forth.

The network device 22 may be a network controller or a network interface card (NIC), and may enable network communication over a local area network (LAN) (e.g., Wi-Fi), a personal area network (e.g., Bluetooth), and/or a wide area network (WAN) (e.g., a 3G or 4G data network). The power source 24 of the device 10 may include a Li-ion battery and/or a power supply unit (PSU) to draw power from an electrical outlet or an alternating-current (AC) power supply.

The display 26 may display various images generated by device 10, such as a GUI for an operating system or image data (including still images and video data). The display 26 may be any suitable type of display, such as a liquid crystal display (LCD), plasma display, or an organic light emitting diode (OLED) display, for example. Additionally, as mentioned above, the display 26 may include a touch-sensitive element that may represent an input structure 14 of the electronic device 10. The imaging device(s) 28 of the electronic device 10 may represent a digital camera that may acquire both still images and video. Each imaging device 28 may include a lens and an image sensor capture and convert light into electrical signals.

In certain embodiments, the display 26 may include a gate driver integrated circuit (IC) 30. The gate driver IC 30 may be separate or integral to the display 26. The gate driver IC 30 may include a chip, such as processor or ASIC, that may control various aspects of the display 26. For instance, the gate driver IC 30 may receive image data from the processor 16 and send gate signals to turn various pixels on and off via gate lines disposed horizontally across the display 26. In certain embodiments, the gate driver IC 30 may send the gate signals to the gate lines via v-gate lines that are disposed parallel to source lines within the display 26. In certain embodiments, in addition to the gate signals, the gate driver IC 30 may send compensation signals to compensation lines that are also disposed parallel to source lines. As mentioned above, the compensation signals may include a similar waveform as provided in the gate signals but with an opposite polarity.

Figure 2:
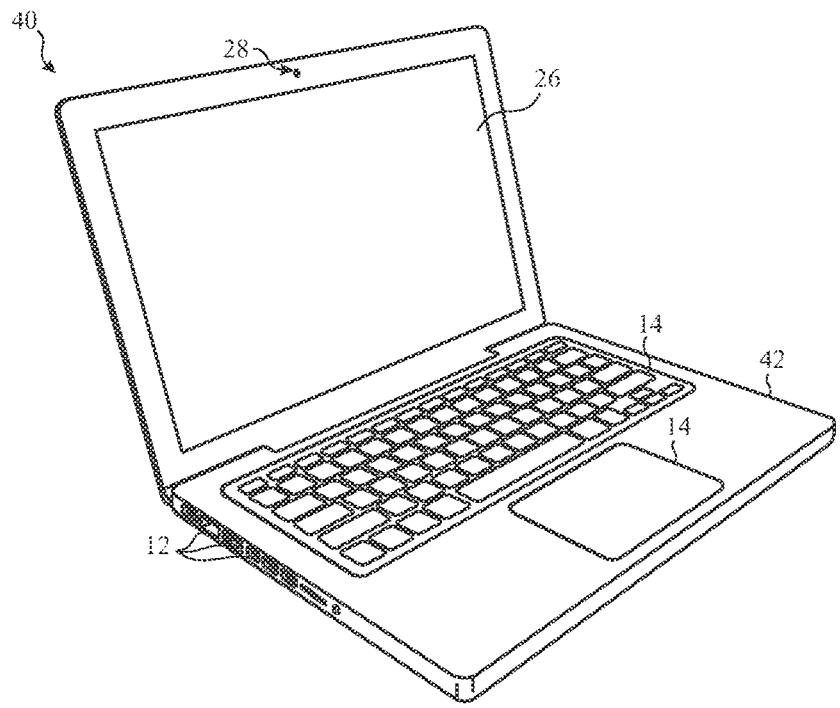
FIG. 2 is a perspective view of the electronic device of FIG. 1 in the form of a notebook computing device, in accordance with embodiments described herein.

With the foregoing in mind, the electronic device 10 may take any number of suitable forms. Some examples of these possible forms appear in FIGS. 2-5. Turning to FIG. 2, a notebook computer 40 may include a housing 42, the display 26, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 24), memory (e.g., memory 18), and storage capabilities (e.g., storage device 20), as described above with respect to FIG. 1.

The notebook computer 40 may include an integrated imaging device 28 (e.g., a camera). In other embodiments, the notebook computer 40 may use an external camera (e.g., an external USB camera or a "webcam") connected to one or more of the I/O ports 12 instead of or in addition to the integrated imaging device 28. In certain embodiments, the depicted notebook computer 40 may be a model of a MacBook®, MacBook® Pro, MacBook Air®, or PowerBook® available from Apple Inc. In other embodiments, the computer 40 may be portable tablet computing device, such as a model of an iPad® from Apple Inc.

Figure 3:
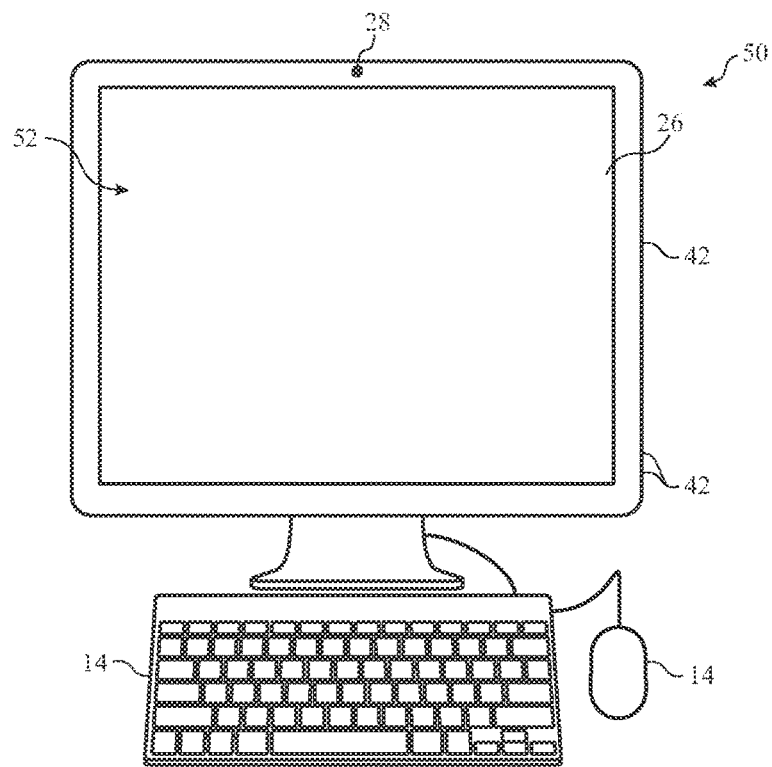
FIG. 3 is a front view of the electronic device of FIG. 1 in the form of a desktop computing device, in accordance with embodiments described herein.

FIG. 3 shows the electronic device 10 in the form of a desktop computer 50. The desktop computer 50 may include a number of features that may be generally similar to those provided by the notebook computer 40 shown in FIG. 4, but may have a generally larger overall form factor. As shown, the desktop computer 50 may be housed in an enclosure 42 that includes the display 26, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 28, which may be an integrated or external camera, as discussed above. In certain embodiments, the depicted desktop computer 50 may be a model of an iMac®, Mac® mini, or Mac Pro®, available from Apple Inc.

Figure 4:
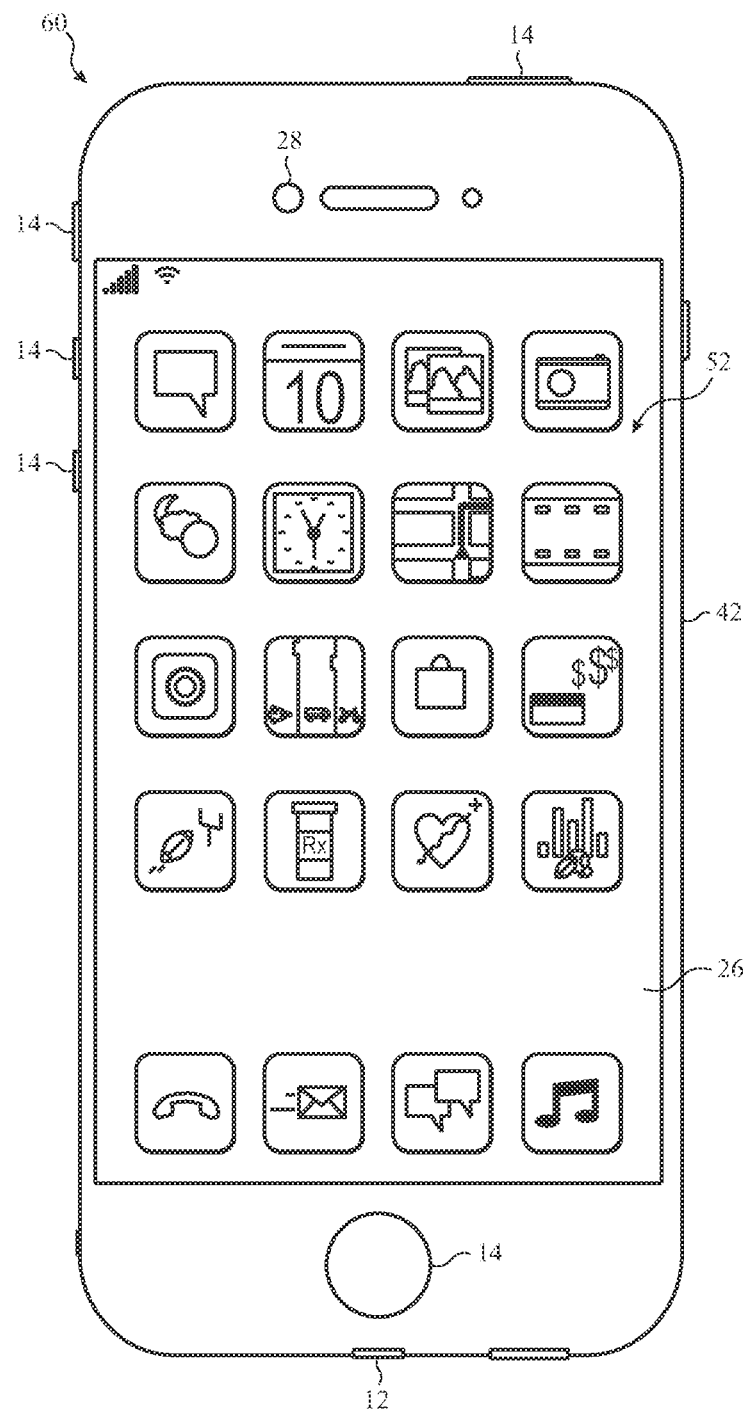
FIG. 4 is a front view of the electronic device of FIG. 1 in the form of a handheld portable electronic device, in accordance with embodiments described herein.
Figure 5:
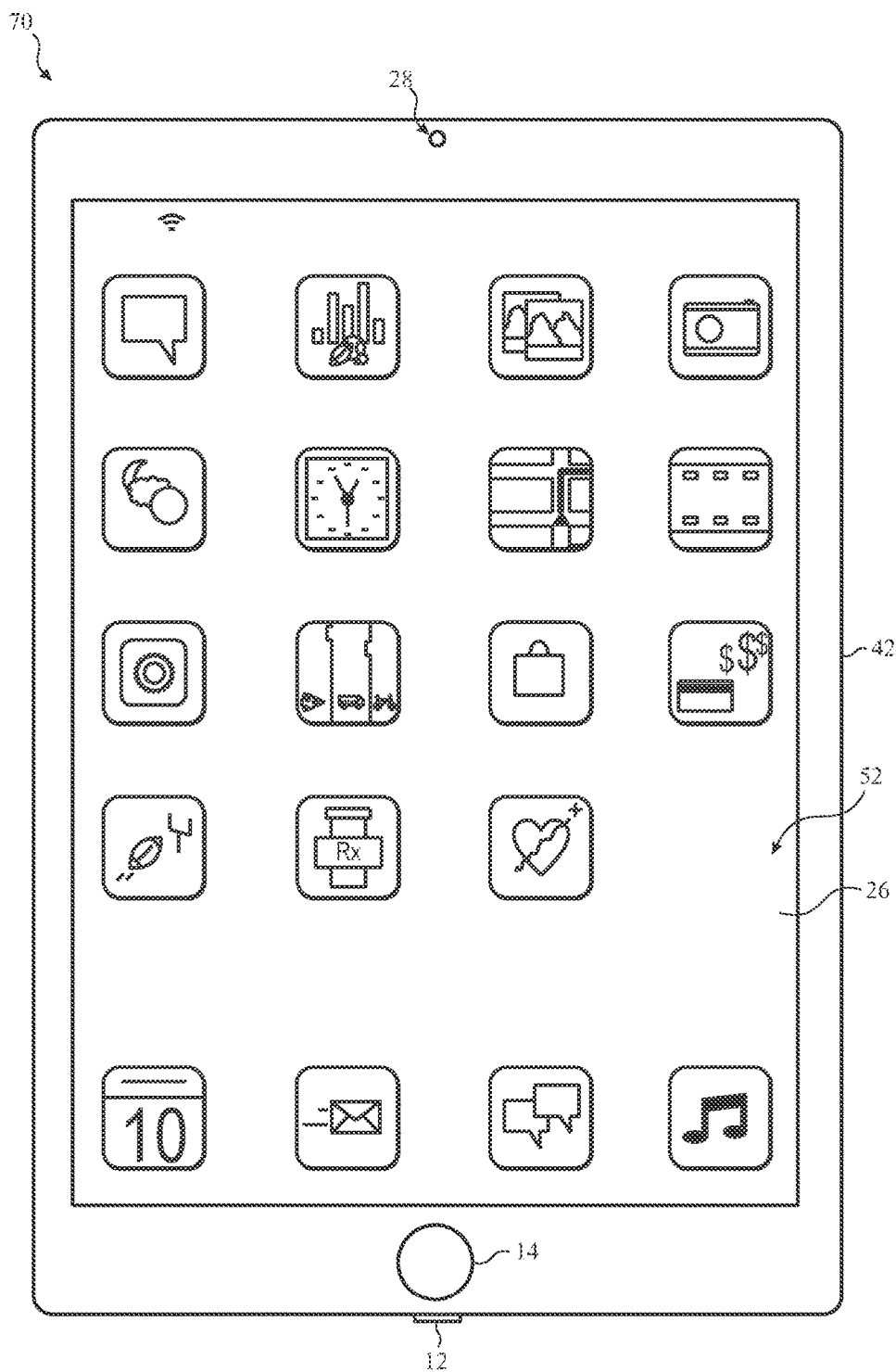
FIG. 5 is a front view of the electronic device of FIG. 1 in the form of a tablet computing device, in accordance with embodiments described herein.

The electronic device 10 may also take the form of portable handheld device 60 or 70, as shown in FIGS. 4 and 5. By way of example, the handheld device 60 or 70 may be a model of an iPod® or iPhone® available from Apple Inc. The handheld device 60 or 70 includes an enclosure 42, which may function to protect the interior components from physical damage and to shield them from electromagnetic interference. The enclosure 42 also includes various user input structures 14 through which a user may interface with the handheld device 60 or 70. Each input structure 14 may control various device functions when pressed or actuated. As shown in FIGS. 4 and 5, the handheld device 60 or 70 may also include various I/O ports 12. For instance, the depicted I/O ports 12 may include a proprietary connection port for transmitting and receiving data files or for charging a power source 24. Further, the I/O ports 12 may also be used to output voltage, current, and power to other connected devices.

The display 26 may display images generated by the handheld device 60 or 70. For example, the display 26 may display system indicators that may indicate device power status, signal strength, external device connections, and so forth. The display 26 may also display a GUI 52 that allows a user to interact with the device 60 or 70, as discussed above with reference to FIG. 3. The GUI 52 may include graphical elements, such as the icons, which may correspond to various applications that may be opened or executed upon detecting a user selection of a respective icon.

Figure 6:
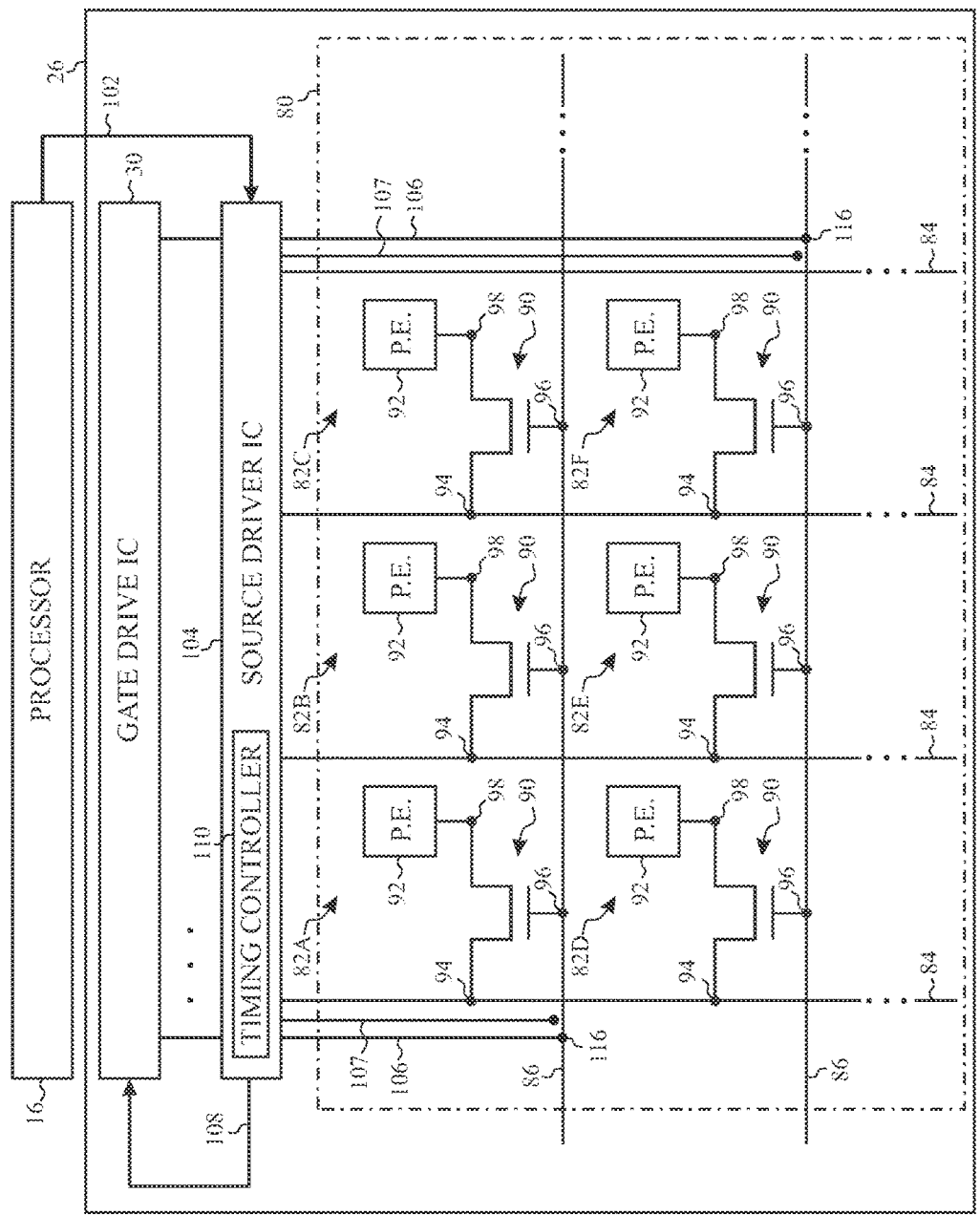
FIG. 6 is a circuit diagram illustrating an example of switching and display circuitry that may be included in the display of the electronic device of FIG. 1, in accordance with aspects of the present disclosure.

Having provided some context with regard to possible forms that the electronic device 10 may take, the present discussion will now focus on the gate driver IC 30 of FIG. 1. Generally, the brightness depicted by each respective pixel in the display 26 is generally controlled by varying an electric field associated with each respective pixel in the display 26. Keeping this in mind, FIG. 6 illustrates one embodiment of a circuit diagram of display 26 that may generate the electrical field that energizes each respective pixel and causes each respective pixel to emit light at an intensity corresponding to an applied voltage. As shown, display 26 may include display panel 80. Display panel 80 may include a plurality of unit pixels 82 disposed in a pixel array or matrix defining a plurality of rows and columns of unit pixels that collectively form an image viewable region of display 26. In such an array, each unit pixel 82 may be defined by the intersection of rows and columns, represented here by the illustrated gate lines 86 (also referred to as "scanning lines") and source lines 84 (also referred to as "data lines"), respectively.

Although only six unit pixels, referred to individually by the reference numbers 82a-82f, respectively, are shown in the present example for purposes of simplicity, it should be understood that in an actual implementation, each source line 84 and gate line 86 may include hundreds or even thousands of unit pixels. By way of example, in a color display panel 80 having a display resolution of 1024×768, each source line 84, which may define a column of the pixel array, may include 768 unit pixels, while each gate line 86, which may define a row of the pixel array, may include 1024 groups of unit pixels, wherein each group includes a red, blue, and green pixel, thus totaling 3072 unit pixels per gate line 86. In the context of LCDs, the color of a particular unit pixel generally depends on a particular color filter that is disposed over a liquid crystal layer of the unit pixel. In the presently illustrated example, the group of unit pixels 82a-82c may represent a group of pixels having a red pixel (82a), a blue pixel (82b), and a green pixel (82c). The group of unit pixels 82d-82f may be arranged in a similar manner.

As shown in the present figure, each unit pixel 82a-82f includes a thin film transistor (TFT) 90 for switching a respective pixel electrode 92. In the depicted embodiment, the source 94 of each TFT 90 may be electrically connected to a source line 84. Similarly, the gate 96 of each TFT 90 may be electrically connected to a gate line 86. Furthermore, the drain 98 of each TFT 90 may be electrically connected to a respective pixel electrode 92. Each TFT 90 serves as a switching element that may be activated and deactivated (e.g., turned on and off) for a predetermined period based upon the respective presence or absence of a scanning signal at gate 96 of TFT 90. For instance, when activated, TFT 90 may store the image signals received via a respective source line 84 as a charge in pixel electrode 92. The image signals stored by pixel electrode 92 may be used to generate an electrical field that energizes the respective pixel electrode 92 and causes the pixel 82 to emit light at an intensity corresponding to the voltage applied by the source line 84. For instance, in an LCD panel, such an electrical field may align liquid crystals molecules within a liquid crystal layer to modulate light transmission through the liquid crystal layer.

In certain embodiments, the display 26 may further include the source driver integrated circuit (source driver IC)

104, which may include a chip, such as a processor or ASIC, that may control various aspects of display 26 and panel 80. For example, source driver IC 104 may receive image data 102 from processor(s) 16 and send corresponding image signals to unit pixels 82a-82f of panel 80. Source driver IC 104 may also be coupled to gate driver IC 30, which may be configured to activate or deactivate pixels 82 via gate lines 86 and vertical gate lines (v-gate lines) 106. As such, source driver IC 104 may send timing information, shown here by reference number 108, via a timing controller 110 to gate driver IC 30 to facilitate activation/deactivation of individual rows of pixels 82. While the illustrated embodiment shows a single source driver IC 104 coupled to panel 80 for purposes of simplicity, it should be appreciated that additional embodiments may utilize a plurality of source driver ICs 104. For example, additional embodiments may include a plurality of source driver ICs 104 disposed along one or more edges of panel 80, wherein each source driver IC 104 is configured to control a subset of source lines 84 and/or gate lines 86.

The v-gate lines 106 may be disposed parallel to the source lines 84 or along a plane that is parallel to the plane in which the source lines 84 lie. In certain embodiments, the v-gate lines 106 may be disposed underneath or above the source lines 84 on a different layer of the panel 80. In any case, the v-gate lines 106 may provide gate voltage signals to the gate lines 86 to control the operation of the TFT 90. The v-gate lines 106 may be arranged in a particular pattern or shape to allow another signal carrying line to be placed adjacent to it, as will be appreciated later. By employing v-gate lines 106 and gate lines 86, the gate driver IC 30 may be positioned along the same edge of the panel 80 as the source driver IC 104. As a result, the other edges of the panel 80 may include less circuitry and thus may be designed to form a variety of different shapes and reduce the size of the respective bezel regions.

In addition to the v-gate lines 106, the display 26 may also include compensation lines 107. As discussed above, the compensation lines 107 may be disposed parallel to the source lines 84 or along another plane parallel to a plane in which the source lines 84 lie. The compensation lines 107 may be arranged in a pattern that mirrors a pattern of the v-gate lines 106. In certain embodiments, the compensation lines 107 may be disposed along the same plane as the v-gate lines 106. Additional details regarding the patterns in which the v-gate lines 106 and the compensation lines 107 may be disposed will be discussed below with reference to FIGS. 13, 14, and 19-22.

In operation, source driver IC 104 receives image data 102 from processor 16 and, based on the received data, outputs signals to control pixels 82. To display image data 102, source driver IC may adjust the voltage of pixel electrodes 92 (abbreviated in FIG. 4 as P.E.) one row at a time. To access an individual row of pixels 82, gate driver IC 30 may send an activation signal to TFTs 90 associated with the particular row of pixels 82 being addressed. This activation signal may render the TFTs 90 on the addressed row conductive. Accordingly, image data 102 corresponding to the addressed row may be transmitted from source driver IC 104 to each of the unit pixels 82 within the addressed row via respective data lines 84. Thereafter, gate driver IC 30 may deactivate TFTs 90 in the addressed row, thereby impeding the pixels 82 within that row from changing state until the next time they are addressed. The above-described process may be repeated for each row of pixels 82 in panel 80 to reproduce image data 102 as a viewable image on display 26.

In sending image data to each of the pixels 82, a digital image is typically converted into numerical data so that it can be interpreted by a display device. For instance, the image data 102 may itself be divided into small "pixel" portions, each of which may correspond to a respective pixel 82 of panel 80. To avoid confusion with the physical unit pixels 82 of the panel 80, the pixel portions of the image data 102 shall be referred to herein as "image pixels." Each "image pixel" of image data 102 may be associated with a numerical value, which may be referred to as a "data number" or a "digital luminance level," that quantifies the luminance intensity (e.g., brightness or darkness) of the image data 102 at a particular spot. The digital level value of each image pixel typically represents a shade of darkness or brightness between black and white, commonly referred to as gray levels. As will be appreciated, the number of gray levels in an image usually depends on the number of bits used to represent pixel intensity levels in a display device, which may be expressed as $2^N$ gray levels, where N is the number of bits used to express a digital level value. By way of example, in an embodiment where display 26 is a "normally black" display using 8 bits to represent a digital level, display 26 may be capable of providing 256 gray levels to display an image, wherein a digital level of 0 corresponds to full black (e.g., no transmittance), and a digital level of 255 correspond to full white (e.g., full transmittance). In another embodiment, if 6 bits are used to represent a digital level, then 64 gray levels may be available for displaying an image.

To provide some examples, in one embodiment, source driver IC 104 may receive an image data stream equivalent to 24 bits of data, with 8-bits of the image data stream corresponding to a digital level for each of the red, green, and blue color channels corresponding to a pixel group including red, green, and blue unit pixel (e.g., 82a-82c or 82d-82f). In another embodiment, source driver IC 104 may receive 18-bits of data in an image data stream, with 6-bits of the image data corresponding to each of the red, green, and blue color channels, for example. Further, although digital levels corresponding to luminance are generally expressed in terms of gray levels, where a display utilizes multiple color channels (e.g., red, green, blue), the portion of the image corresponding to each color channel may be individually expressed as in terms of such gray levels. Accordingly, while the digital level data for each color channel may be interpreted as a grayscale image, when processed and displayed using unit pixels 82 of panel 80, color filters (e.g., red, blue, and green) associated with each unit pixel 82 allows the image to be perceived as a color image.

With the foregoing in mind, FIG. 7 illustrates an exploded perspective view of the panel 80. As shown in FIG. 7, the panel 80 may include a layer 112 and a layer 114. The layer 112 may include the source lines 84 and the gate lines 86. The layer 114 may include the v-gate lines 106 and compensation lines 107, and the v-gate lines 106 may electrically couple to the gate line 86 via a cross point node 116. The v-gate line 106 may couple to the gate line 86 at the cross point node 116 using metal vias or the like. Generally, each v-gate line 106 may couple to a respective gate line 86 via a respective cross point node 116. As such, signals generated by the gate driver IC 30 may be provided to the gate line 86 via the cross point node 116 and the v-gate lines 106. In operation, when providing voltage signals to the gate line 86, the voltage applied to the TFT 90 of a respective may be a high or low voltage used to activate or deactivate the pixel electrode 92 of the respective pixel 82. The compensation lines 107 may be coupled to the gate driver IC 30; however, the compensation lines 107 may not be coupled to the gate lines 86 like the v-gate lines 106. Instead, the compensation lines 107 may be designed to maintain a voltage signal to counteract the gate signals provided to the v-gate lines 106.

In some cases, when transitioning from a high voltage to a low voltage, the expected signal received by the respective pixel electrode 92 via the gate line 86 may correspond to the voltage signal 122 depicted in the graph 120 of FIG. 8. In the same manner, the expected signal received by the respective pixel electrode 92 via the respective source line 84 may correspond to the data line signal 124.

However, due to the proximity between each respective source line 84 and each respective v-gate line 106, the cross point node 116 may experience a voltage kickback disturbance. This kickback disturbance is caused due to a coupling effect that occurs between the v-gate line 106 and source line 84. That is, since the v-gate line 106 may be disposed underneath the source line 84, a coupling effect may be induced due to the respective voltages present on each line. Generally, the kickback disturbance may be more pronounced at a pixel located near a cross point node 116, as compared to pixels located further away from the cross point node 116.

For instance, FIG. 9 depicts a graph 130 that illustrates an example data line signal that may experience a kickback disturbance induced by the coupling effect between the source line 86 and the v-gate line 106. As shown in FIG. 9, a voltage signal 132 may represent a voltage of a respective gate line 86, and a data line signal 134 may represent a voltage received by the respective pixel electrode 92 via a respective source line 84. When the voltage signal 132 transitions from high to low, the respective pixel electrode 92 may receive a kickback disturbance or voltage disturbance that may distort the data line signal 134 being transmitted via the respective source line 86. That is, the kickback voltage may be induced from a gate coupling to the source line 84 above the v-gate line 106. The kickback voltage may then be transferred through the respective TFT 90 to the respective pixel electrode 92 during gate turn off or turn on. In the example depicted in FIG. 9, the data line signal 134 may decrease when the voltage signal 132 transitions from high to low. As a result, the respective pixel electrode 92 may not produce a desired brightness or grey level, as specified by the image data 102.

Referring back to FIG. 7, the kickback disturbance or voltage may be generated due at least partly to a coupling effect between the source line 84 and the v-gate line 106. The coupling effect is represented in the panel 80 of FIG. 7 as a capacitance 118 between the source line 84 and the v-gate line 106. As mentioned above, the pixels 82 located at or near the cross point nodes 116 may experience a larger amount of kickback voltage as compared to other pixels along the respective gate line 86. In some cases, the kickback voltage may be up to 300 mV, which may distort the images depicted on the display 26.

Figure 10:
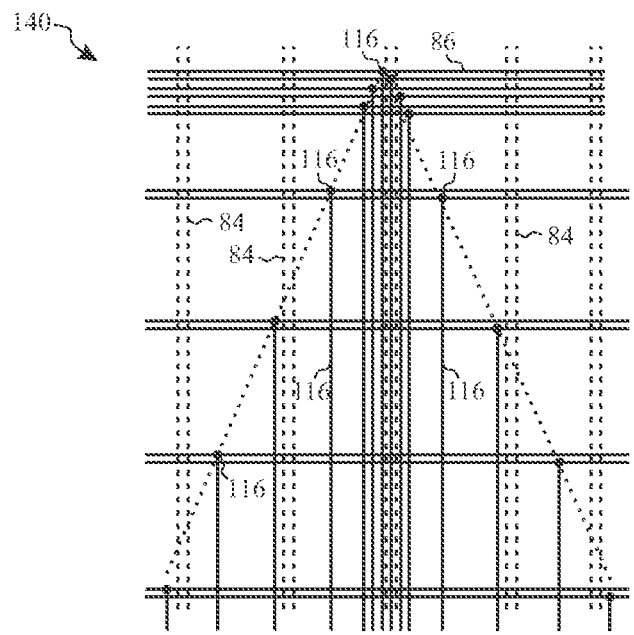
FIG. 10 is a circuit diagram illustrating example locations of cross point pixels of the display in the electronic device of FIG. 1, in accordance with aspects of the present disclosure.

Keeping this in mind, FIG. 10 is an example layout 140 that illustrates sample positions of cross point nodes 116 with respect to source lines 84, gate lines 86, and v-gate lines 106. Although FIG. 10 illustrates a particular layout of the cross point nodes 116, it should be understood that, in other embodiments, the cross point nodes 116 may be positioned in other arrangements.

Figure 11:
FIG. 11 is an illustration of visual effects that may be depicted in the display in the electronic device of FIG. 1, in accordance with aspects of the present disclosure.

FIG. 11 illustrates an example image 150 depicted on the display 26 having the cross point nodes 116 positioned according to the layout of FIG. 10. The example image 150 may depict image data that displays the same grey level value for each pixel in the example image 150. However, as shown in the example image 150 of FIG. 10, the pixels located at or near the cross point nodes 116 each have a lower grey level, as compared to the remaining pixels in the example image 150. This reduced grey level may be induced by the coupling effect between the gate lines 86 and the v-gate lines 106 discussed above.

Figure 12:
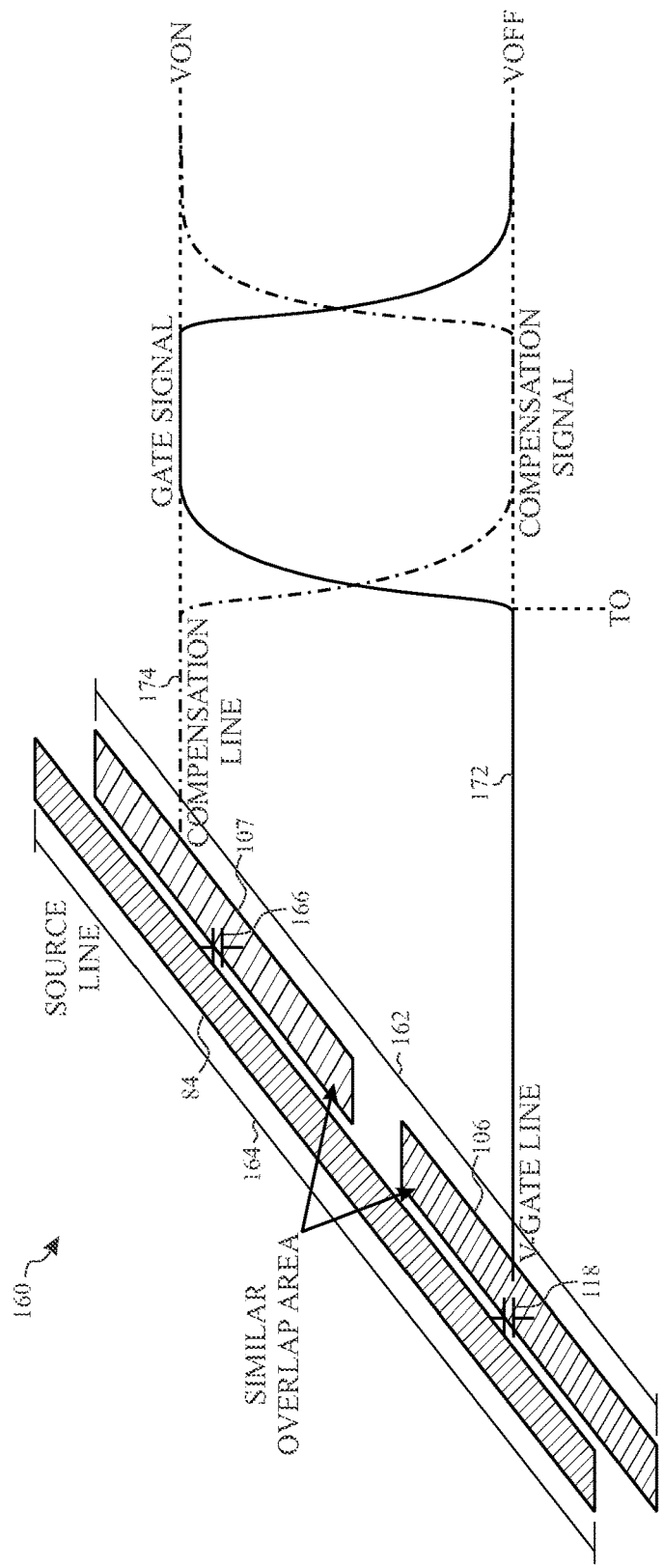
FIG. 12 is a schematic diagram illustrating an arrangement of a v-gate line and a compensation line with respect to a source line of the display in the electronic device of FIG. 1, in accordance with aspects of the present disclosure.

With the foregoing in mind, in certain embodiments, FIG. 12 includes a schematic diagram of an exploded view 160 depicting an example arrangement of a portion of the source line 84 along with portions of the v-gate line 106 and the compensation line 107. As shown in FIG. 12, the v-gate line 106 and the compensation line 107 may be disposed along the same plane 162 and may be adjacent to each other. Additionally, the plane 162 in which the v-gate line 106 and the compensation line 107 lie may be disposed along parallel to a plane 164 in which the source line 84 may be disposed.

As discussed above, a capacitance 118 may be present between the v-gate line 106 and the source line 84 due to the coupling effect discussed above. In the same manner, a capacitance 166 may also be present between the compensation line 107 and the source line 84. That is, since the compensation line 107 is within a close proximity to the source line 84, a coupling effect may also be present between the compensation line 107 and the source line 84. The coupling effect may thus be represented in FIG. 12 as the capacitance 166.

As mentioned above, the gate driver IC 30 may provide a gate signal to the v-gate line 106 to operate the gate 96 of the TFT 90. An example gate signal 172 is illustrated on FIG. 12. In the same manner, the gate driver IC 30 may also provide a compensation signal 174 to the compensation line 107. As illustrated in FIG. 12, the compensation signal 174 may be a similar waveform as the gate signal 172, but at an opposite polarity. That is, as the gate signal 172 increases at time T0, the compensation signal may decrease at time T0. The waveforms of the gate signal 172 and the compensation signal 174 may thus mirror each other with respect to polarity. As a result, the coupling effect induced by the v-gate line 106 may be reduced or neutralized by the coupling effect created by the compensation line 174.

Figure 13:
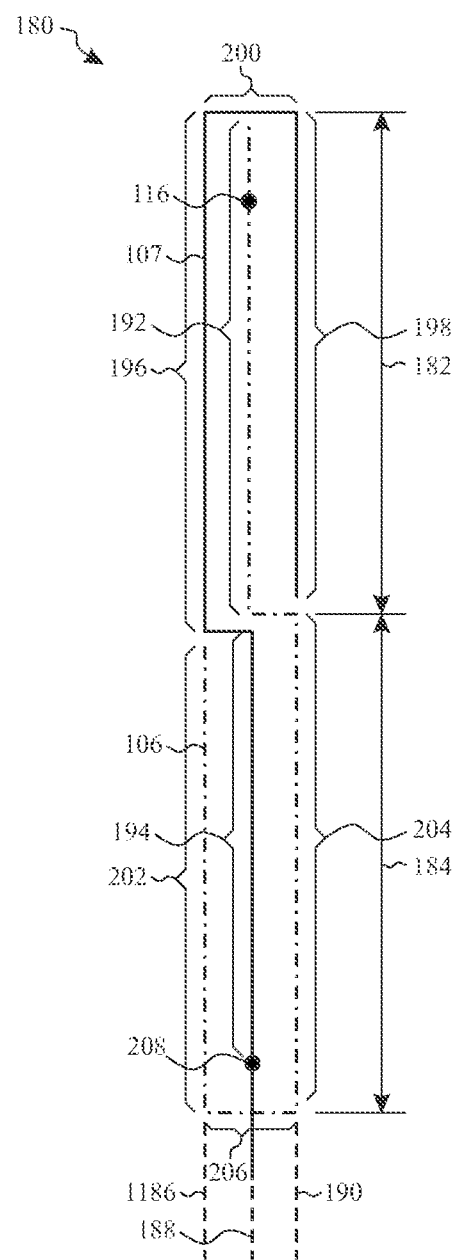
FIG. 13 is a schematic wiring diagram illustrating a unit arrangement of a v-gate line and a compensation line of the display in the electronic device of FIG. 1, in accordance with aspects of the present disclosure.
Figure 14:
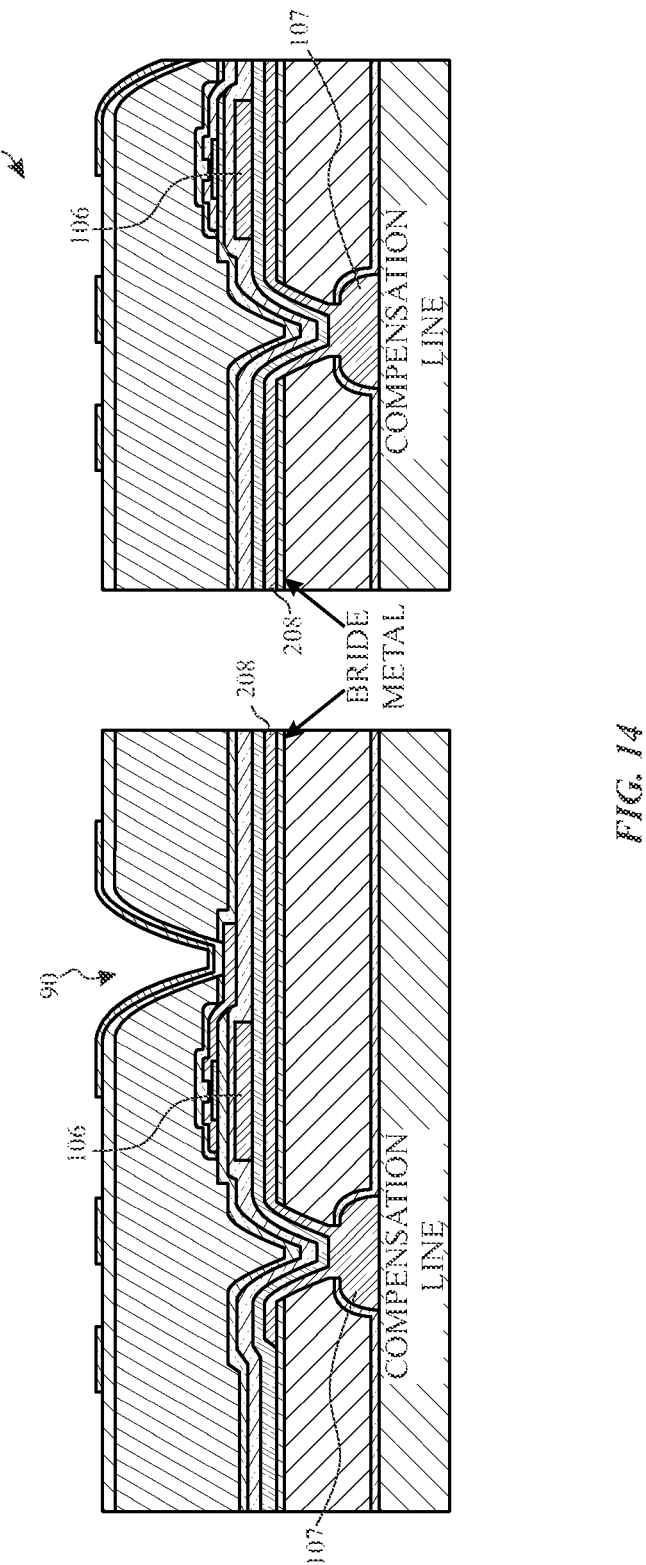
FIG. 14 is a diagram illustrating layers of the display in the electronic device of FIG. 1, in accordance with aspects of the present disclosure.
Figure 13:
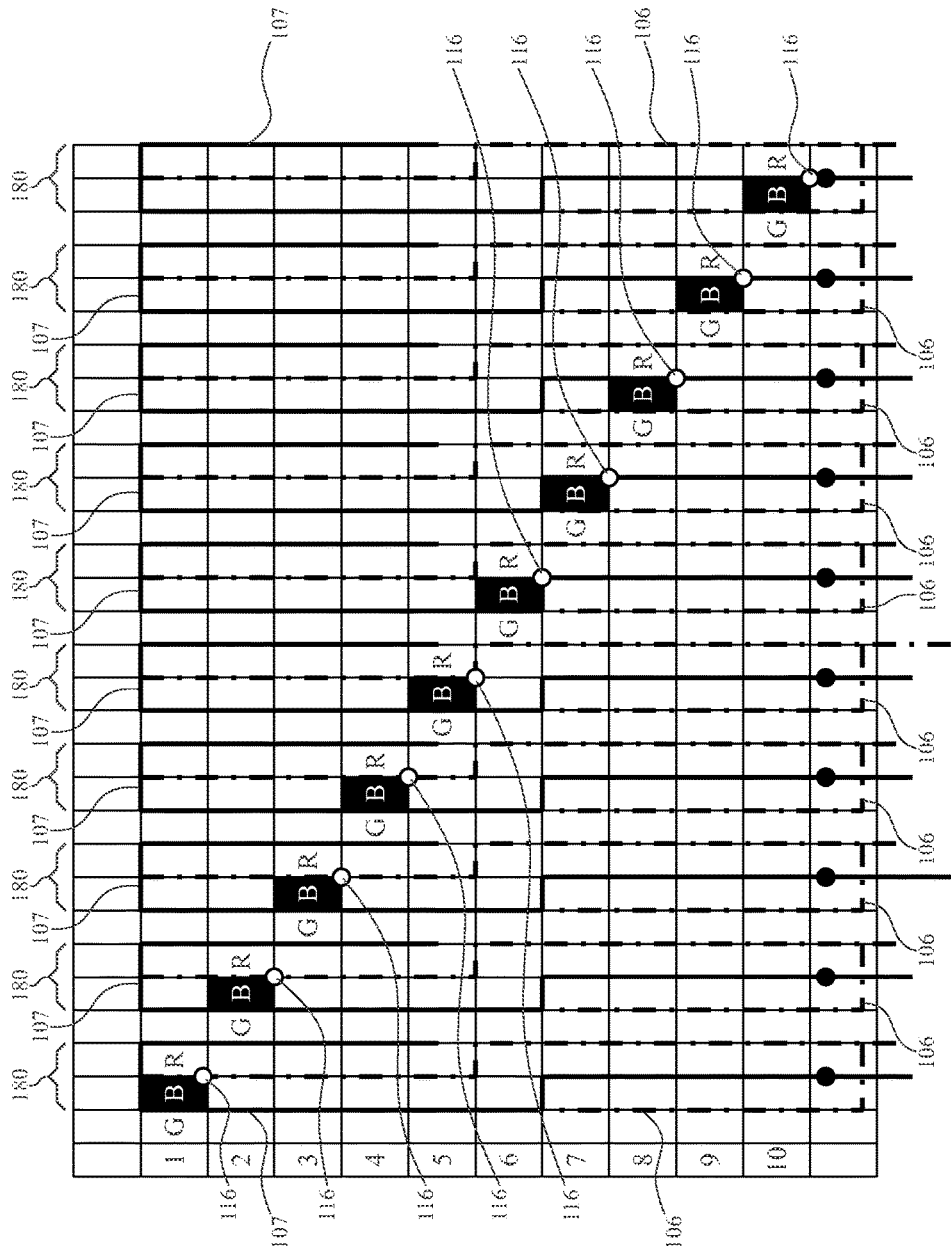

To effectively mitigate the coupling effect generated by the v-gate line 106, the v-gate line 106 and the compensation line 107 may be arranged in a pattern, such that a portion of the v-gate line 106 surrounds a portion of the compensation line 107 and another portion of the compensation line 107 surrounds another portion of the v-gate line 107. For example, FIG. 13 illustrates a unit arrangement 180 of the v-gate line 106 and the compensation line 107. The unit arrangement 180 depicts how the v-gate line 106 and the compensation line 107 may be disposed above or below three source lines 186, 188, and 190. As shown in FIG. 14, the unit arrangement 180 may include a top portion 182 and a bottom portion 184. The top portion 182 may include a first portion 192 of the v-gate line 106 disposed adjacent to a second source line 188. Accordingly, since the top portion 182 may mirror the bottom portion 184 with regard to the v-gate line 106 and the compensation line 107, the bottom portion 184 may include a first portion 200 of the compensation line 107 disposed adjacent to a second source line 188.

The first portion 192 of the v-gate line 106 may be surrounded by a second portion 196, a third portion 198, and a fourth portion 200 of the compensation line 107. That is, the top portion 182 may include the first portion 192 of the v-gate line 106 parallel to a second source line 188, the second portion 196 of the compensation line 107 parallel to the first source line 186, and the third portion 198 of the compensation line 107 parallel to the third source line 190. The fourth portion 200 of the compensation line 107 may connect the second portion 196 to the third portion 198 and may be perpendicular to the first portion 192 of the v-gate line 106. The fourth portion 200 may also surround the first portion 192.

The bottom portion 184 of the unit arrangement 180 may be structured similar to that of the top portion 182 except that the positions of the portions of the v-gate line 106 and the compensation line 107 are reversed. That is, the bottom portion 184 may include the first portion 194 of the compensation line 107 parallel to a second source line 188, the second portion 202 of the v-gate line 106 parallel to the first source line 186, and the third portion 204 of the v-gate line 106 parallel to the third source line 190. The fourth portion 206 of the v-gate line 106 may connect the second portion 202 to the third portion 204 and may be perpendicular to the first portion 194 of the compensation line 107. The fourth portion 206 may also surround the first portion 194.

The unit arrangement 180 may also include the cross point node 116 where the v-gate line 106 may be electrically coupled to the gate line 86. Additionally, the unit arrangement 180 may also include a bridge node 208 where the compensation line 107 may bridge over or under the fourth portion 206 of the v-gate line 106. As shown in FIG. 13, the fourth portion 206 of the v-gate line 106 may be disposed across the first portion 194 of the compensation line 107. Since the compensation line 107 and the v-gate line 106 are separate electrical conduction paths, the bridge node 208 enables the compensation line 107 to pass over or under the v-gate line 106 without contacting any portion of the v-gate line 106. FIG. 14 illustrates a diagram of layers 210 of the display 26 that depict example locations of the compensation line 107 and the v-gate line 106 within the TFT 90. As shown in FIG. 14, the bridge node 208 may be a metal or electrically conductive material that may electrically couple two portions of the compensation line 107 together.

With the foregoing in mind, FIG. 15 illustrates an example wiring arrangement of a number of unit arrangements of v-gate lines 106 and compensation lines 107. As shown in FIG. 15, the unit arrangement 180 described above may be repeated across a display panel 80 for each cross point node 116. In one embodiment, the cross point nodes 116 may be positioned diagonally across the panel 80. However, it should be noted that the cross point nodes 116 may also be positioned in other locations. In any case, by repeating the unit arrangement 180 across the panel 80, the kickback voltage generated by the coupling effect between the source line 84 and the v-gate line 106 may be mitigated by a neutralizing coupling effect between the source line 84 and the compensation line 107.

Figure 16:
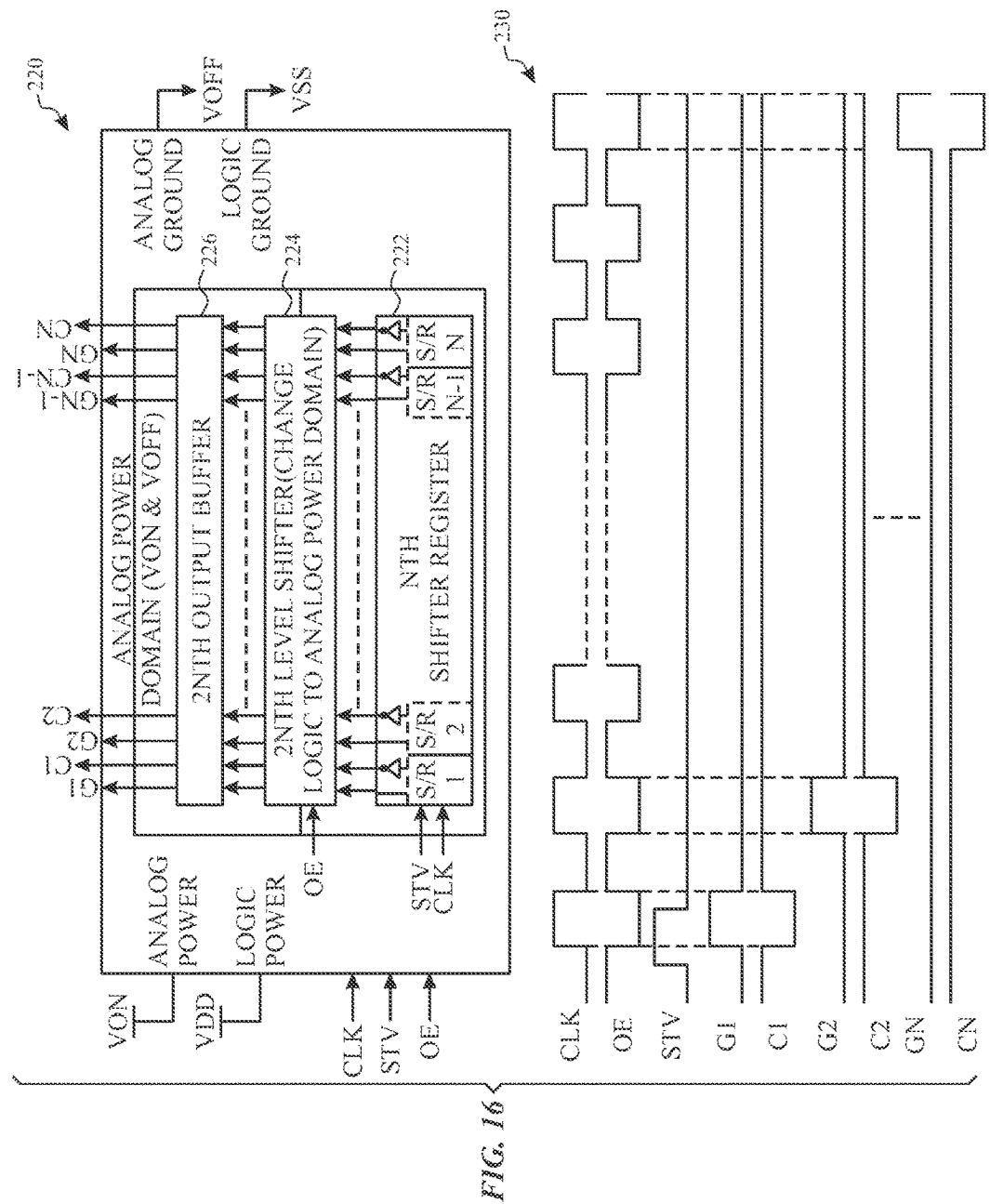
FIG. 16 is a block diagram illustrating components in a gate driver integrated circuit (IC) of the display in the electronic device of FIG. 1, in accordance with aspects of the present disclosure.

To send gate signals and compensation signals, the gate driver IC 30 may include certain circuit components to generate the gate signals and the compensation signals. FIG. 16 illustrates example components that may be part of an example gate driver IC 220. The gate driver IC 30 may include an Nth shifter register 222, a second Nth level shifter 224, and a second Nth output buffer 226. The Nth shifter register 22 may prepare a logical gate signal and/or a logically complementary compensation signal, which the second Nth level shifter 224 may convert to analog gate and analog compensation signals. The second Nth output buffer 226 may output the gate signal and the compensation signal based on these analog signals.

In one embodiment, the Nth shifter register may include an inverter to invert a gate signal and generate a compensation signal. When operating, the gate driver IC 30 may send gate signals and compensation signals at each clock signal received by the Nth shifter register 222. For example, referring to timing diagram 230, at one clock signal, a gate signal and a corresponding compensation signal may be transmitted to a v-gate line 106 and a compensation line 107, respectively. At a subsequent clock signal, another gate signal and another corresponding compensation signal may be transmitted to a second v-gate line 106 and a second compensation line 107, respectively. This pattern may continue until all of the v-gate lines 106 and the compensation lines 107 have received a gate signal and a compensation signal. The pattern may continuously repeat to depict image data on the display 26.

Figure 17:
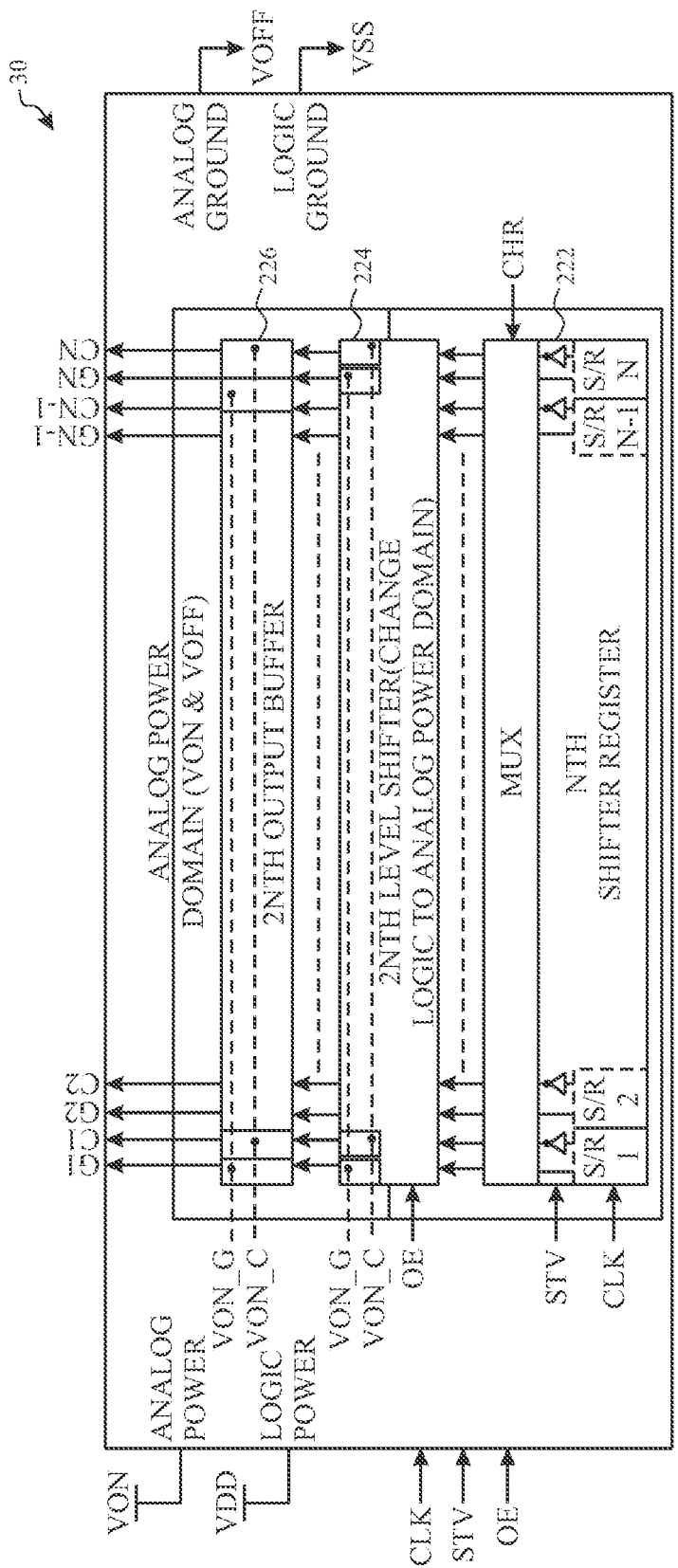
FIG. 17 is a block diagram illustrating components in a gate driver integrated circuit (IC) of the display in the electronic device of FIG. 1, in accordance with aspects of the present disclosure.

In certain embodiments, the gate driver IC 30 may be coupled to two separate voltage sources to generate the gate signal and the compensation signal. For example, FIG. 17 illustrates a gate driver IC 230 that includes similar components as described above with respect to gate driver IC 220; however, the gate driver IC 230 may receive voltages Von_G and Von_C from two separate voltage sources. In this case, the gate driver IC 230 may use the voltage Von_G to generate the gate signal and the voltage Von_C to generate the compensation signal. As such, the gate signal and the compensation signal may not interfere with each other. Moreover, the compensation signal may be adjusted to provide a higher or lower amplitude as compared to the gate signal to better mitigate the kickback voltage.

For instance, FIG. 18 illustrates how the voltage Von_C may be adjusted to better compensate or mitigate the kickback voltage experienced by a cross point node 116. That is, the amplitude of the compensation signal may be adjusted to be higher or lower than the corresponding amplitude of the gate signal. This adjustment may enable the kickback voltage experienced at a cross point node 116 to be more accurately compensated depending on various other factors related to the display 26. For example, different positions on the display 26 may experience different kickback voltages due to different coupling effects being induced between the v-gate line 106 and the source line 84. As such, to better neutralize this coupling effect, the compensation signal may be modified to have a larger or smaller amplitude as compared to the amplitude of the gate signal provided via the v-gate line 106.

In addition to adjusting the amplitude of the compensation signal, the arrangement of the v-gate lines 106 and the compensation lines 107 may be modified to better compensate for the kickback voltage. For example, FIG. 19 illustrates an embodiment in which winding points 240 may be positioned in different locations for each unit arrangement 180. That is, considering the arrangement of the v-gate lines 106 and the compensation lines 107 depicted in FIG. 15, the winding points of the v-gate lines 106 and the compensation lines 107 of FIG. 15 remain in the same position across the panel 80. In certain embodiments, as illustrated in FIG. 19, the winding point 240 or the location at which the v-gate line 106 and the compensation line 107 change orientation may be different for each unit arrangement 180. In some cases, by changing the location of the winding point 240, the kickback voltage at various cross point nodes 116 may be better mitigated or neutralized.

In another embodiment, the thickness of a portion of the v-gate line 106 or the compensation line 107 may be larger than the remaining portions of the v-gate line 106 or the compensation line 107. For instance, FIG. 20 illustrates a first unit arrangement 252 of v-gate lines 106 and compensation lines 107 that includes a portion 254 of the compensation line 107 that has a larger width as compared to the remaining portions of the compensation line 107. In the same manner, FIG. 20 also illustrates a second unit arrangement 256 of v-gate lines 106 and compensation lines 107 that includes a portion 258 of the v-gate line 106 that has a larger width as compared to the remaining portions of the v-gate line 106. In some instances, by changing the width of at least a portion of the v-gate line 106 or the compensation line 107, the kickback voltage at various cross point nodes 116 may be better mitigated or neutralized.

Figure 21:
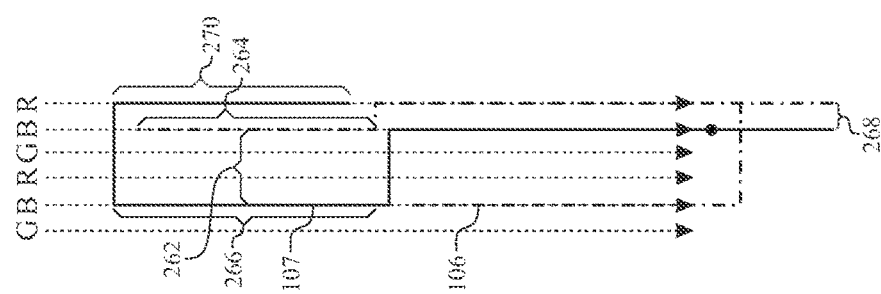
FIG. 21 is a schematic diagram illustrating an alternate unit arrangement of v-gate lines and compensation lines with spacing between each other, in accordance with aspects of the present disclosure.

In yet another embodiment, the spacing between portions of the v-gate line 106 and portions of the compensation line 107 are not uniform. That is, for instance, as illustrated in FIG. 21, a distance 262 between a portion 264 of the v-gate line 106 and a portion 266 of the compensation line 107 may be different than a distance 268 between the portion 264 of the v-gate line 106 and a second portion 270 of the compensation line 107. By spacing of at least a portion of the v-gate line 106 from other portions of the compensation line 107, the kickback voltage at various cross point nodes 116 may be better mitigated or neutralized.

Figure 22:
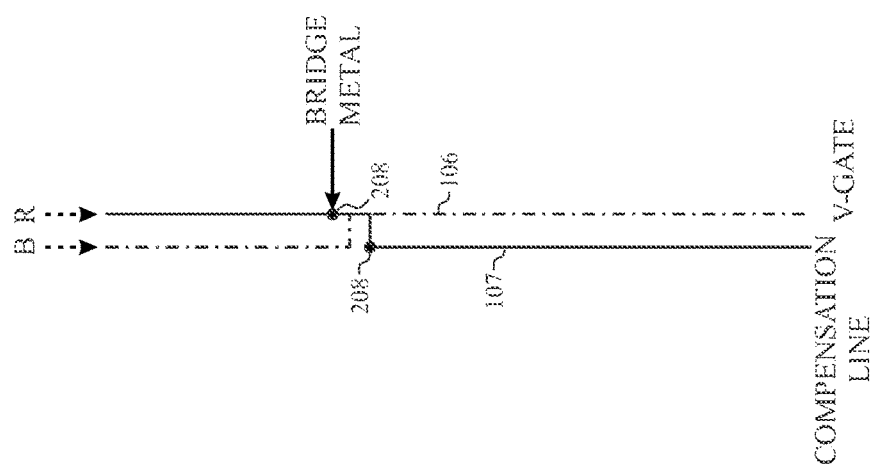
FIG. 22 is a schematic diagram illustrating an alternate unit arrangement of v-gate lines and compensation lines with a bridge metal, in accordance with aspects of the present disclosure.

In another embodiment, as illustrated in FIG. 22, the placement of the bridge node 208 where the compensation line 107 bridges over or under the v-gate line 106 may be positioned in different locations as compared to the arrangement depicted in FIGS. 13 and 15. By placing the bridge node 208 at different locations along the v-gate line 106, the kickback voltage at various cross point nodes 116 may be better mitigated or neutralized.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device, comprising:
 a plurality of pixels;
 a plurality of source lines configured to provide a plurality of data line signals to the plurality of pixels;
 a plurality of gate lines configured to provide a plurality of gate signals to a plurality of switches associated with the plurality of pixels;
 a plurality of vertical gate lines disposed generally parallel to the plurality of source lines and coupled to the plurality of gate lines at a plurality of cross point nodes; and
 a plurality of compensation lines, each compensation line proximate and parallel to a respective vertical gate line of the plurality of vertical gate lines, wherein the plurality of compensation lines are configured to transmit a respective plurality of compensation signals, each being an inverse of a respective gate signal of the plurality of gate signals to reduce or eliminate a kickback voltage on at least one of the plurality of pixels, and wherein the plurality of compensation lines is configured to reduce a coupling effect between the plurality of vertical gate lines and the plurality of source lines of at least one cross point node of the plurality of cross point nodes, and wherein the plurality of gate lines and the plurality of compensation lines are positioned above or below the plurality of source lines.

2. The display device of claim 1, wherein a first vertical gate line of the plurality of vertical gate lines comprises a first portion surrounded by a first portion, a second portion, and a third portion of a first compensation line of the plurality of compensation lines.

3. The display device of claim 2, wherein the first portion and the second portion of the first compensation line are generally parallel to the first portion of the first vertical gate line.

4. The display device of claim 3, wherein the third portion of the first compensation line is perpendicular to the first portion of the first vertical gate line.

5. The display device of claim 1, wherein the plurality of vertical gate lines and the plurality of compensation lines are generally parallel to the plurality of source lines.

6. The display device of claim 1, wherein the plurality of vertical gate lines and the plurality of compensation lines are above or below the plurality of source lines.

7. The display device of claim 1, comprising a gate driver integrated circuit (IC) configured to send the plurality of gate signals to the plurality of pixels via the plurality of vertical gate lines.

8. The display device of claim 1, comprising a gate driver integrated circuit (IC) configured to send the respective plurality of compensation signals to the plurality of compensation lines.

9. The display device of claim 1, wherein a first pattern of each of the plurality of compensation lines mirror a first pattern of each of the plurality of vertical gate lines.

10. A display panel, comprising:
 a plurality of pixels configured to display image data;
 a plurality of source lines configured to provide a plurality of data line signals to the plurality of pixels;
 a plurality of gate lines configured to provide a plurality of gate signals to a plurality of switches associated with the plurality of pixels;
 a plurality of vertical gate lines disposed generally parallel to the plurality of source lines, and wherein the plurality of vertical gate lines are disposed on a first plane; and
 a plurality of compensation lines disposed adjacent and parallel to the plurality of vertical gate lines, wherein each of the plurality of compensation lines are disposed on a second plane situated above or below and parallel to the first plane, wherein each of the plurality of compensation lines is configured to transmit an inverse of a respective gate signal transmitted via a respective adjacent vertical gate line of the plurality of gate lines, wherein the plurality of compensation lines and the plurality of vertical gate lines are coupled to a source driver configured to output the plurality of gate signals and an inverse of the plurality of gate signals, and wherein each of the plurality of compensation lines is configured to reduce a coupling effect between the plurality of vertical gate lines and the plurality of source lines of at least one cross point node.

11. The display panel of claim 10, wherein each vertical gate line and each compensation line of the plurality of vertical gate lines and the plurality of compensation lines comprise a winding point, and wherein each respective winding point is adjacent to each other.

12. The display panel of claim 10, wherein each vertical gate line and each compensation line of the plurality of vertical gate lines and the plurality of compensation lines comprise a winding point, and wherein each respective winding point is located at different positions with respect to each other.

13. The display panel of claim 10, wherein at least one vertical gate line of the plurality of vertical gate lines, at least one compensation line of the plurality of compensation lines, or any combination thereof is associated with a thicker metal width as compared to another vertical gate line, another compensation line, or any combination thereof.

14. The display panel of claim 10, wherein a first portion of a first vertical gate line of the plurality of vertical gate lines is a first distance away from a first portion of a first compensation line of the plurality of compensation lines and a second distance away from a second portion of the first compensation line, wherein the first distance and the second distance are different.

15. The display panel of claim 10, wherein at least one compensation line of the plurality of compensation lines comprises a first portion and a second portion, wherein the first portion and the second portion is coupled together via a bridge metal.

* * * * *